United States Patent [19]
Barton

[11] 3,991,457
[45] Nov. 16, 1976

[54] HEATER TUBE ARRANGEMENTS
[75] Inventor: David W. Barton, Birmingham, Mich.
[73] Assignee: Ford Motor Company, Dearborn, Mich.
[22] Filed: Nov. 4, 1974
[21] Appl. No.: 520,689

Related U.S. Application Data
[62] Division of Ser. No. 466,653, May 3, 1974, Pat. No. 3,965,976.

[52] U.S. Cl. .............................. 29/157.3 R; 60/517; 60/524; 29/156.4 R; 29/157.3 B
[51] Int. Cl.² ........................................ B23P 15/26
[58] Field of Search ........................... 60/517, 524; 29/157.3 R, 157.3 A, 157.3 V, 157.3; 165/176 US, 171

[56] References Cited
UNITED STATES PATENTS

| 740,207 | 9/1903 | White | 165/176 |
|---|---|---|---|
| 3,018,544 | 1/1962 | Whistler, Jr. | 29/157.3 R |
| 3,229,766 | 1/1966 | Keith | 29/157.3 A |
| 3,332,134 | 7/1967 | Denis et al. | 219/82 |
| 3,822,553 | 7/1974 | Grahn | 60/517 |

Primary Examiner—C. W. Lanham
Assistant Examiner—V. K. Rising
Attorney, Agent, or Firm—Joseph W. Malleck; Keith L. Zerschling

[57] ABSTRACT

A heater head assembly of the type useful in a hot gas engine is disclosed. The assembly has a plurality of tubes or passages providing a communicating connection for the gas between high temperature working chambers and regenerators. In one embodiment, manifold extensions are provided for each of the working chambers and regenerators and between which banks of heater tubes extend. Each of said manifolds contain at least one blind flow turn-around or reverter structure whereby hot gases traversing between a working chamber and a regenerator must travel the spacing therebetween a minimum of three times. Each of said tube banks are formed by uniting two plys of sheet metal along spaced pairs of parallel lines of brazing, the zone within each pair of brazing lines being expanded to define gas passages for said tube bank and the zone between pairs of brazing lines being perforated to admit cross-flow of a surrounding heating medium.

2 Claims, 8 Drawing Figures

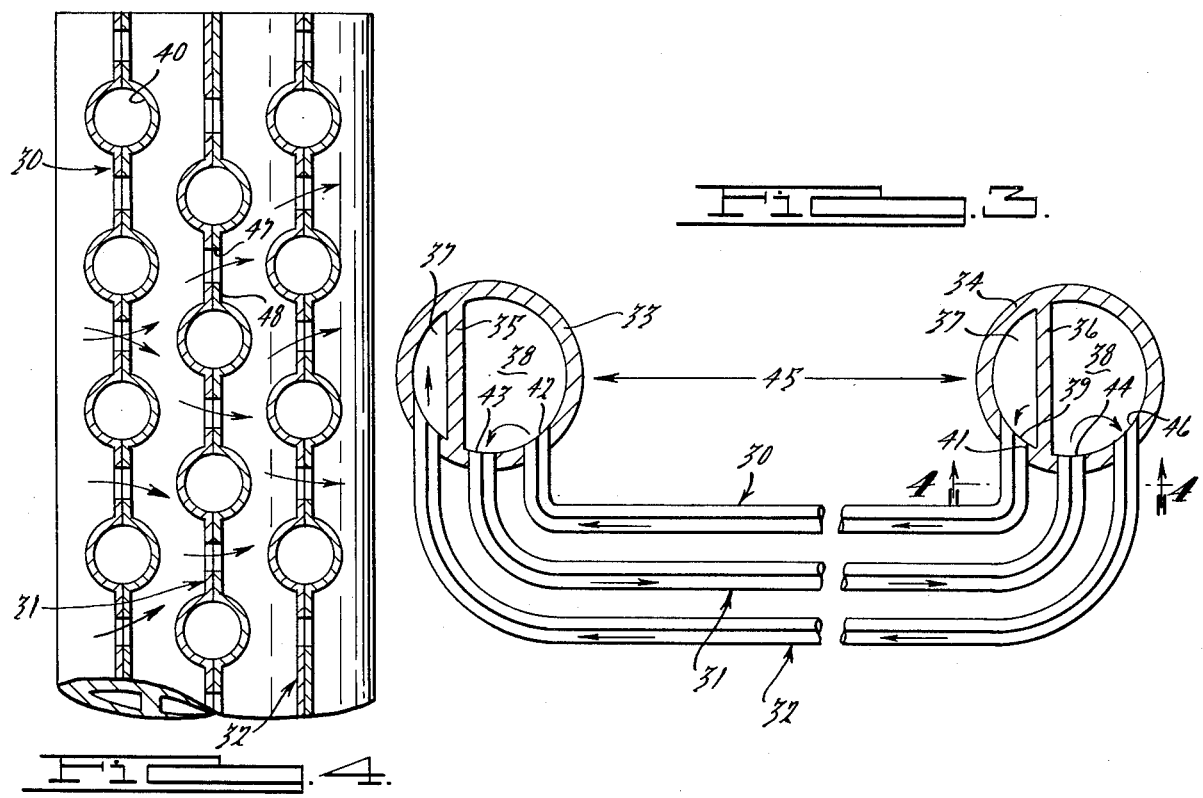
FIG. 3.
FIG. 4.
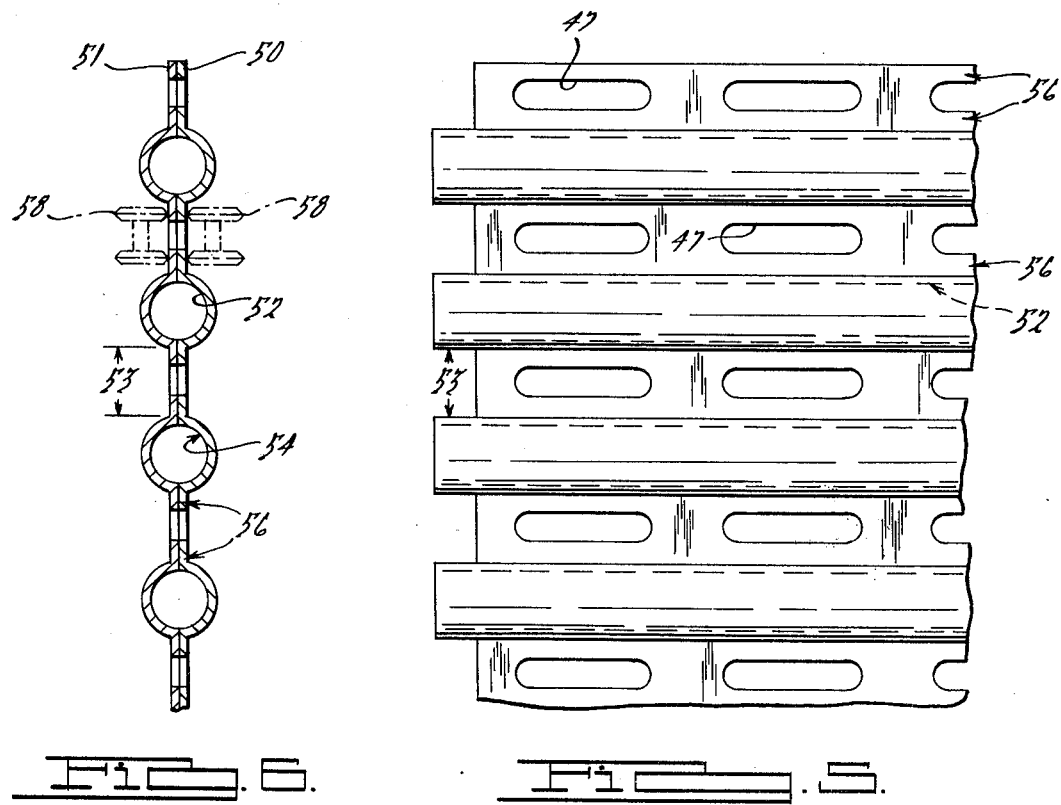
FIG. 6.
FIG. 5.

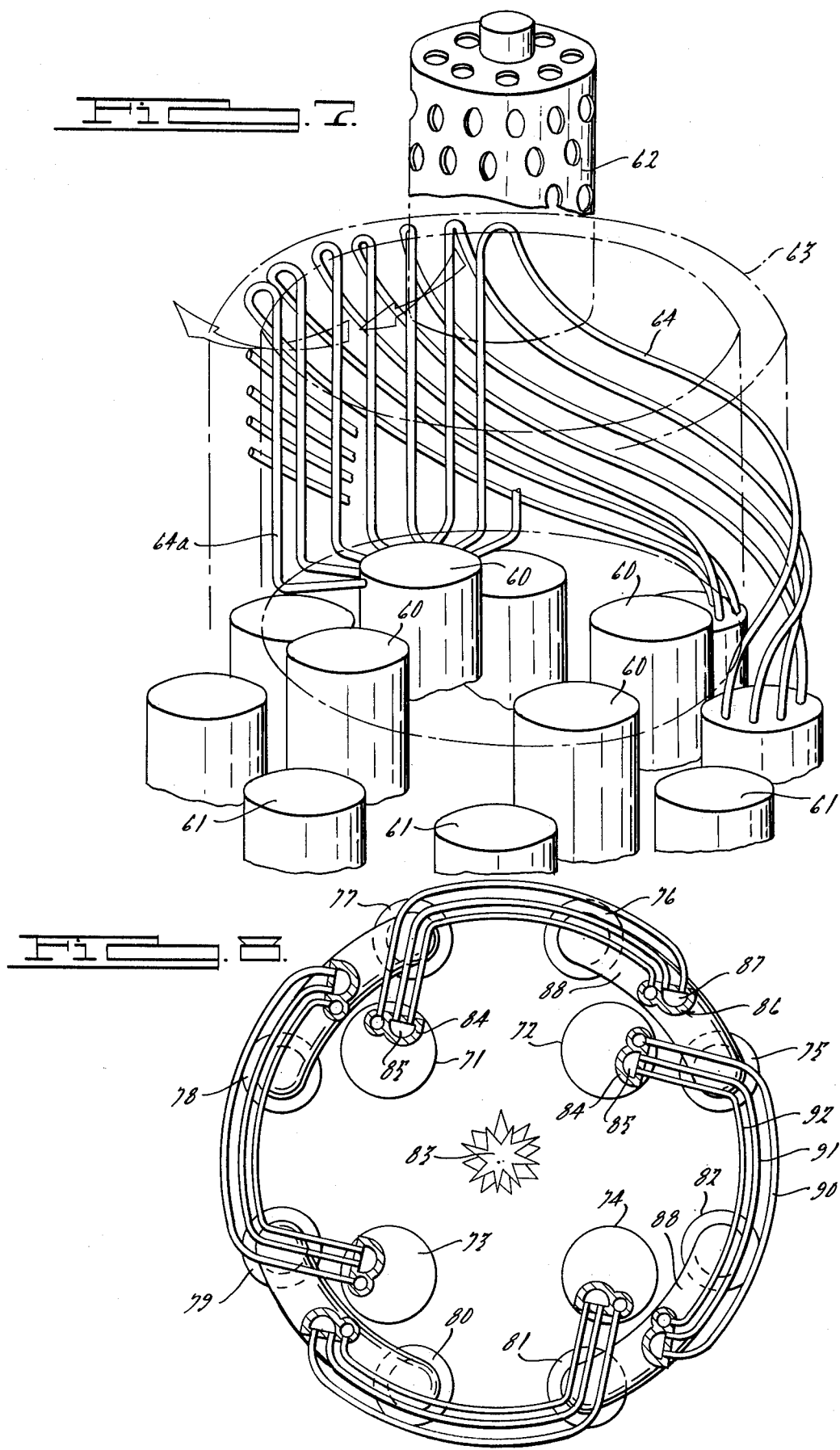

HEATER TUBE ARRANGEMENTS

This is a Division of application Ser. No. 466,653, filed May 3, 1974, now U.S. Pat. No. 3,965,976.

BACKGROUND OF THE INVENTION

This invention relates to a Stirling engine and particularly to the type known as double-acting in which each piston acts as a power piston and a displacer simultaneously. Heat from an outside heat source such as an external flame is added to the engine through a heater head assembly containing a working gas. The working gas is expanded to operate a piston within a working chamber; continuous external heating and cooling of the working gas provides for a full cycle engine. The complete cycle takes place in one revolution of the crankshaft as opposed to multiple revolutions required by conventional piston engines. To make the engine more practical, regenerators are located between the fixed heating and the cooling sources; such regenerators store otherwise wasted heat during the cooling process and permit recovery of the heat during the heating phase. This stored heat is equal to several times the heat added from the outside heat source.

One of the most difficult problems for the Stirling engine is to optimize heat transfer characteristics through the walls of the heater tubes or pipes, since the output of the engine is dependent thereon. It is desirable that the heat absorbing surface area of the heater head assembly or tube complex should be as great as possible and that the heat flux be as great as possible. However, the volume of the gas in the tubes or pipes must be as small as possible as this volume is a "dead" volume in the working cycle; similarly it is desired that the resistance against the flow of the working gas through the heater tubes should be as low as possible.

Heretofore, prior art constructions have attempted to meet such conflicting goals by utilizing tubes of a very small internal bore and using such tubes in great numbers to permit a large surface area to come in contact with the working gas passing within. The tubes were arranged to cause the working gas to flow on a singular path from the working chamber to or from the regenerator. In most instances, such tubes were exposed to one single pass of the surrounding heating medium and in certain instances, as described more fully in the detailed description, a partial double pass was provided. With these constructions, the temperature of the exhaust gases, having passed through and against such heater tubes, was at an extremely high temperature range indicating that the heat content thereof was not transferred as efficiently as possible to the working gas within the tubes.

To meet this problem, regenerative wheels have been utilized so that heat could be collected from the exhaust gases and returned to the incoming air to be combined with fuel for combustion; thus the exhaust heat content was in part returned to the cycle. Such regenerative wheels present many attendant problems including unnecessary cost.

In another attempt to meet this problem, the heat tubes were arranged not only to project linearly from the working chamber but were additionally bent to have a U-shape and/or connected to a ring-shaped manifold located above the working chamber and regenerator. These arrangements have not allowed an increase of the number of pipes due to space. Accordingly, it was necessary to increase the length of the pipes and thus also to increase the resistance against the gas flow therein. Fins or heat conducting surfaces were added to the lengthened portions of the pipes to improve heat transfer; such fins have proved to be costly, fragile and difficult to manufacture. It has become evident that this manner of increasing heat absorbing capacity is limited and in certain respects undesirable.

SUMMARY OF THE INVENTION

The primary object of this invention is to provide a hot gas engine of the type which utilizes a heater head assembly for imparting heat to a closed working gas system, the heater head assembly being characterized by improved heat transfer performance permitting elimination of auxiliary heat restorative devices while insuring that exhaust gas exit temperatures are 600° F or below.

Another object is to provide an improved heater head assembly for a hot gas engine by deploying reverter elements in each of the headers connected to a working chamber or regenerator, the distance between each associated working chamber and regenerator a great number and thus more effectively exposed to cross-flow of the surrounding heated medium.

Yet another object of this invention is to provide an economical method and construction for a heater tube assembly which facilitates automated manufacture of a unitized heater head assembly having controlled fine sizing of passages for hot gas flow.

Specific features pursuant to the above objects comprise the use of stamped heater tube banks formed from plys of sheet metal which are united together at spaced pairs of brazed lines, flow passages being defined within each pair of lines and the zone between pairs of lines is perforated to permit cross-flow of the surrounding heated medium. Preferably, a series of at least three banks extend between manifolds or headers connected to each of the regenerators and working chambers, each manifold having a blind flow turnaround or reverter element integrally cast as an internal dividing wall.

SUMMARY OF THE DRAWINGS

FIG. 3 is an enlarged view similar to a portion of FIG. 2 but embodying the principles of this invention;

FIG. 4 is a view taken substantially along line 4—4 of FIG. 3;

FIG. 5 is a side elevational view of a tube bank of this invention in one stage of manufacture;

FIG. 6 is an end view of the structure of FIG. 5 illustrating a step in the fabrication of the tube bank;

FIG. 7 is a schematic perspective view of another type of prior art Stirling engine, the regenerators and working chambers are arranged about a cylindrical cluster; and FIG. 8 is a diagramatic view taken along a plane passing horizontally through the heater tube assembly of FIG. 7, but embodying the principles of the present invention and thereby representing an alternative embodiment.

DETAILED DESCRIPTION

Exchanging the heating and cooling sources is a cumbersome process. Therefore common Stirling engines replace the alternating use of hot and cold sources by addition of a mechanism called a displacer piston which serves to move the gas between a stationary hot chamber and a stationary cold chamber. The displacer piston mechanism allows the heating source to be stationary at one end of the cylinder and the cooling source to be stationary at the other end. When the displacer piston moves upward, the hot working gas from the upper portion of the cylinder is first moved through heater tubes and then flows through the cooling coil where it is cooled until most of the working gas is in the cold section below the displacer piston. Because the gas is cool, its pressure is low. Moving the piston downward forces the working gas back through the cooling coils and into the heater tubes where it is heated and forced into the hot section above the displacer piston. Since the gas is now hot, its pressure is high. There are no valves in the flow path, so that when the upper chamber is at high pressure, the lower chamber is also at high pressure.

The embodiments disclosed herein to illustrate the invention are hot-gas engines of the double-acting type. In this type, each piston serves as both a power piston and as a displacer piston for an adjacent working cylinder, thus the name double-acting. This type makes it possible to construct an engine having four separate interconnected cylinders and control the motion of the pistons by device which phases them at 90° intervals.

Figure 1:
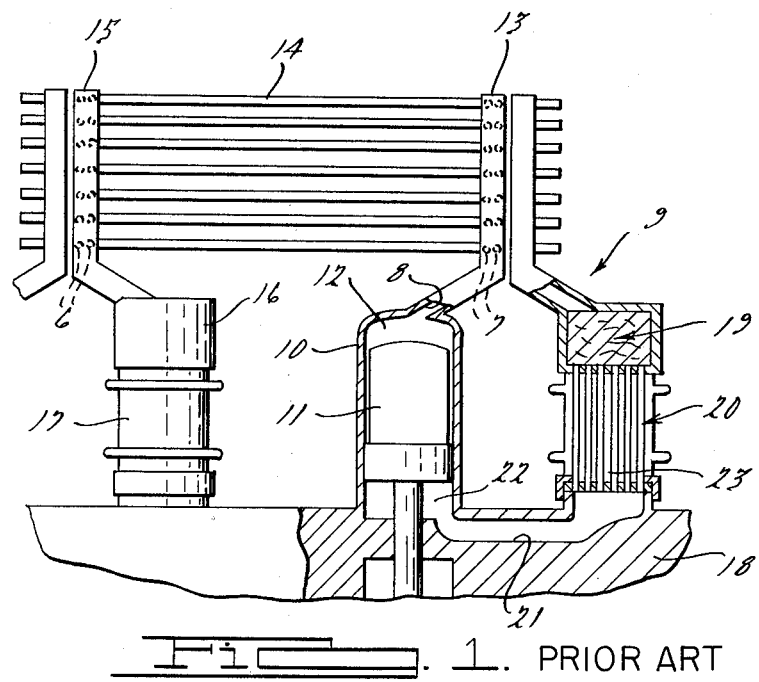
FIG. 1 is a schematic elevational view of a one prior art Stirling engine of the double-acting piston type having upright manifolds provided with horizontally arranged heater tubes extending therebetween.

To point out the inventive contribution of FIG. 3, the prior art construction of FIG. 1 shall be discussed first. The latter is a construction popularly promoted by United Stirling of Sweden and has a plurality of working chambers alternating with a plurality of regenerators, all arranged about a circle. The working chambers may have their longitudinal extent canted to form a V-4 or V-8 relationship, such as in a piston engine.

In particularity, engine 9 employs a cylinder wall 10 together with a piston 11 to define a high temperature working chamber 12. A substantially upright manifold 13 extends from an opening 8 in the upper portion of wall 10. A plurality of arcuately shaped heater pipes or tubes 14 extend generally horizontally parallel to each other to provide a closed communication between vertically aligned openings 7 in manifold 13 and vertically aligned openings 6 in a similar manifold 15 secured to and communicating with an opening 5 in the top of regenerator 16; the regenerator is in turn mounted on a cooler 17. The cooler 17 is secured to the portion 18 of the engine. Another regenerator 19 and another cooler 20 are shown in sectional view. The working gas from the heater head assembly will pass through a regenerator and a cooler through a duct 21 to a low temperature working chamber 22 located under the piston 11. Each cooler comprises parallel pipes 23 extending vertically and surrounded by a flow of cooling agent. Each cooler is rigidly connected at its bottom to the engine portion but is flexible to allow sideways movement of the top of the cooler. Sideways movement will occur when there are changes in the temperature of the pipes following starting and stopping of the engine.

Figure 2:
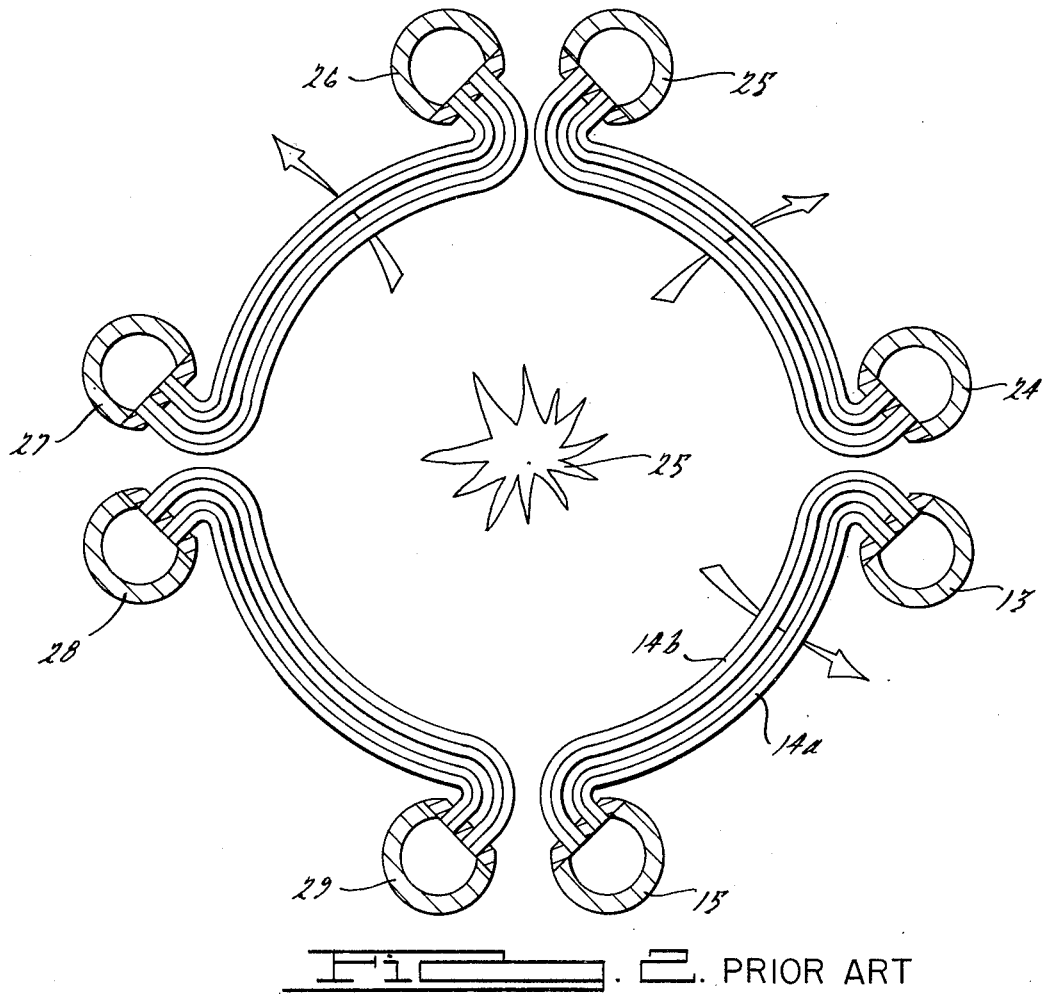
FIG. 2 is an enlarged schematic sectional view of the heater head assembly of FIG. 1.

Working gas in the closed system between each working chamber and regenerator, travels a single pass when traversing the distance separating the associated manifolds (i.e. 13 and 15). This is best illustrated by reference to FIG. 2. The tubes 14 can be seen to be arranged in a double layer 14a and 14b; each layer is shown with 7 tubes aligned along an upright direction and therefore a total of 14 tubes interconnect each pair of associated manifolds. Four working chambers and four regenerators are utilized and disposed in a ring about the interior combustion space having a heat source 25. The upright manifolds (24–29 and 13, 15) emanating from these working chambers and regenerators, would be arranged as in FIG. 2 with double-layer tubing system therebetween.

The total heat absorbing surface area of the heater head assembly of this prior art construction is useful because the manifolds are made taller than other prior art concepts; the tubing is increased in number and at higher elevations.

Unfortunately, the heated medium (exhaust gases from the combustion at 25) flows past each tube only once and any heat transfer must take place quickly during this momentary interchange; considerable residual heat is retained in the exhaust gas after passing through the header heat assembly which results in an inefficient engine and other related problems.

In accordance with the present invention and as shown in FIG. 3, the heater tube assembly preferably has a minimum of three tube banks; designated 30, 31 and 32, extending between manifold or headers 33 and 34. Manifold 31 may be connected to a working chamber and manifold 32 may be connected to a regenerator. Each manifold is subdivided by an integrally cast wall 35 and 36 respectively; the wall in conjunction with a blind closure member (not shown) at either end of the manifold, defines a flow turn-around means or reverter element which functions to prevent flow (see arrows) from communicating with a working chamber or regenerator to which the specific manifold is directly connected. The interior of each manifold is accordingly divided into two portions, a first portion 37 communicating directly with a working chamber or regenerator and portion 38 has flow communication only with tube banks 30 and 31. Flow emanating from one manifold and traveling to the other manifold is returned by the turn-around means once at each manifold. To provide this result, the ends of each tube bank must be sequence as follows: tube bank 30 has the entrance openings 39 for each of the passages 40 connected to complimentary openings 41 entering upon portion 37 of the manifold 34 which communicates with the regenerator. The working medium, such as hydrogen, is caused to flow through the passages 40 of the tube bank 30 and exit from openings 42 into portion 38 of manifold 33. Flow is reverted to bank 31 (see arrows) by entering entrance openings 43; portion 38 is closed except for said latter communication. The exit openings 44 for tube bank 31 enter upon the portion 38 of manifold 34. The reverter or flow turn-around means of portion 38 prevents flow from being in communication with the regenerator; accordingly, having traveled twice the distance 45 separating the two manifolds, is caused to return a third time by entering upon the entrance openings 46 of tube bank 32, passing therealong to enter the portion 37 of manifold 33. Portion 37 is in communication with a working chamber.

The above is a description of flow for one momentary cycle of the engine, it being understood the sequence of flow is reversed repeatedly and therefore the entrance and exit terminology must be exchanged. The combusted gases serve as a surrounding heating medium which flows crossways through openings 47 in the margins 48 of the tube banks separating the passages 40. As best shown in FIG. 4, the cross-flow encounters the closed flow of the working medium a minimum of three times, thereby increasing the heat exchange capabilities.

Now turning to FIGS. 5 and 6, the heater tube banks are illustrated with respect to the method of manufacture. In the past, heat exchange devices, of the type generally shown here, have been made by uniting two flat metallic sheets which are pressure welded together at separated patterns; the unbonded areas between said patterns are distended by inflation to produce tubular passages. Such distention cannot define the very fine, almost hypodermic needle size passages which are required for the Stirling type heater head assembly. In this invention, the separate plys 50 and 51 of sheet metal, utilized to form the tube bank are stamped with grooves 52 having a hemi-spherical section; the grooves are arranged parallel and separated by a distance 53 equal to or less than the diameter of a completed passage 54. During the stamping operation, perforations or elongated openings 47 are defined in the contiguous margin zone 56 between the grooves 52; openings 47 permit the combustion gases to pass therethrough. The perforations are arranged on adjacent banks so that a non-direct flow of heating medium must pass therearound. Continuous lines of uniting are provided at 56 adjacent the groove or passage. The plys are mated together so that the contiguous margins at 56 are in solid contact; continuous welding rollers 58 are employed to provide a welded seam along such uniting lines.

A preferred method would comprise the following steps:

a. prepare cast metallic headers for connection to each working chamber and regenerator, each header having a cylindrical tube with an integral wall separating the interior of said tube into first and second portions and being supported in an upright orientation, b. prepare a tube bank, for connecting with two of said headers, by uniting two plys of highly heat conductive sheet metal along spaced pairs of lines. Between, but not within every pair of lines, a tube passage is preformed in each ply by a groove having a hemi-spherical cross-section; when the plys are mated, the complimentary grooves define a cylindrical passage. Within each pair of lines, elongated perforations are punched to provide freedom for a surrounding medium to flow crossways through said bank, and c. providing rows of openings along the length of each header, each row to receive the ends of one bank of expanded passages for conducting gas thereto, two rows of said openings being in communication with the first portion of said header and the other row being in communication with the second portion of said header, said first portion being sealed to prevent communication with either said working chamber of regenerator and the tube ends being sealed to said headers while disposed in said openings.

FIG. 7 illustrates another type of double-acting piston Stirling engine according to the prior art. This construction is properly known as the swash plate design. Four working chambers or cylinders 60 and eight regenerators 61 are wrapped about a cylindrical outline 63. A single centralized head source is utilized (burner unit 62); each cylinder 60 is connected to two regenerators 61 by a tube labyrinth 64. The labyrinth is comprised of discrete and independent tubes containing the working gas, preferably hydrogen. Cooler tubes (not shown) are connected also to the respective cylinders and regenerators; the cooler tubes are generally located between and slightly outboard of the cylinders. Pistons in each cylinder 60 have rows extending axially therefrom to contact a swash plate (not swash shown); four torque impulses phased at 90° intervals are imparted per revolution of the plate, similar to an eight cylinder internal combustion engine but with impulses of a smaller magnitude.

Each tube 64 of the labyrinth has a first portion 64a which is uprightly parallel to the axis of cylinder 63; each tube is provided with a hair-pin turn at 64b and a portion 64c is arcuately spiralled to interconnect with a regenerator. Combusted gases from within the cylinder 22 and about burner unit 62 pass radially outwardly, no more than twice, past the working flow within the tubes 64. More heat is extracted from tube portion 64a than 64c; accordingly it is common to employ fins and auxiliary heat exchange surfaces along portion 64c to promote greater heat transfer. This, however, introduces undesirable manufacturing problems.

The swash-plate design of FIG. 7 can be redefined according to the principles of this invention to provide the construction shown in FIG. 8. Working chambers or cylinders 71, 72, 73 and 74 and regenerators 75–82 are again arranged about a cylinder with source 83 located at the axis. Headers 84 having reverter elements 85 extend uprightly from each working chamber and a header 86 having a reverter element 87 extend uprightly from a transition section 88 interconnecting two regenerators. The function of a multiple pass of the surrounding heating medium across the tube layers 90, 91, 92 is similar to that in the preferred embodiment of FIGS. 3 and 4.

I claim as my invention:

1. A method of manufacturing a heater head assembly of the type useful in a hot gas engine where a labyrinth of heat-exchange passages provide a closed connection for trapped gas to reversibly communicate between a high temperature working chamber and a thermal regenerator, said labyrinth of tubes selectively receiving heat from a surrounding heated medium, the method comprising:

a. preparing cast metallic headers with one suitable for connection to one or more working chambers and a second suitable for connection to one or more regenerators, each header being characterized by a cylindrical tube an integral wall separating the interior of said tube into first and second portions, said tube being supported with the tube axis in an upright orientation, b. preparing tube bank each adapted for connection at opposite sides thereof to said one and second headers, each bank having two plys of highly heat conductive sheet metal joined together along spaced pairs of lines, said preparation including forming a tube passage between every other pair of lines by exerting fluid pressure therein causing the portion of said plys between a pair of lines to expand and define a cylindrical passage, punching elongated and separated perforations between each pair of lines having unexpanded ply portions to provide freedom for the surrounding medium to flow crossways through said bank, and c. providing at least three rows of openings along the axial extent of each header, each row to receive the ends of one bank of expanded passages for conducting gas thereto, two rows of said openings being in communication with the first portion of said header and the third row being in communication with the second portion of said header, said first portion of each header being sealed to prevent communication with either said working chamber or regenerator, said tube ends of each tube bank being sealed to said headers while disposed in a row of openings one tube bank having the tube ends thereof connected at one side to the portion of one header having said two rows of openings and the other side connected to the portion of the other header having one row of openings.

2. The method as in claim 1, in which said plys are joined by welding using rollers to provide a resistance weld along said lines, and the spacing between said pairs of lines being greater than the spacing within each pair.

* * * * *